Patented Oct. 3, 1933

1,928,901

UNITED STATES PATENT OFFICE 1,928,901

MANUFACTURE OF CONFECTIONERY OF THE GUM DROP TYPE

John M. Krno, Brooklyn, and Adolf Schildberger, New York, N. Y., assignors to International Patents Development Company, Wilmington, Del., a corporation of Delaware No Drawing. Application March 5, 1931
Serial No. 520,469

20 Claims. (Cl. 99—11)

This invention relates to the manufacture of confectionery of the gum type, such as gum drops, Turkish paste, jellies and the like. Gum drops are the principal species of this class of confectionery and will be referred to particularly in this specification with the understanding, however, that the improvements provided by this invention are applicable to other confections of this general class.

Essentially the gum drop batch has consisted, heretofore, of sucrose, corn syrup, starch, water, inverting agents and flavoring material together with agar-agar and gum arabic, in some cases, in order to obtain certain modifications in the consistency of the product.

It has been discovered, however, and this is the basis of the present invention, that certain advantages are obtained, both in respect to the character and quality of the product and also in the manufacture of the same, if dextrose in the form of the pure crystalline product be substituted in part, or in some cases wholly, for sucrose.

The products are less sweet, which is an advantage in itself, and which also makes it possible to better bring out certain flavors. The gum is shorter, the dextrose having a shortening effect, somewhat resembling the effect of agar-agar. There is less tendency to graining or crystallization of the sugar, which is to be avoided in a gum product. The product is more readily digestible.

In respect to manufacture, the batch is less viscous, the viscosity of a dextrose solution being less than that of a sucrose solution of the same water content, so that the boiling period may be shortened and also the period of dehydration in the starch molds. The shorter boiling results in less coloration. The use of dextrose for sucrose furthermore permits a greater proportion of corn syrup to be used without making the gum stringy or "chewy"; or permits a smaller proportion of corn syrup, which may be desirable in some instances, in either case without risk of granulation. The lower viscosity results in easier handling by the depositing machine. The confection may be made, if desired, to contain a larger proportion of solid sugar to corn syrup. In general, the dextrose constituent makes possible a wider range of characteristics in product and facilitates the management and control of the batch in whatever manipulations are necessary in order to obtain such desired characteristics.

The most common practice heretofore in making gum drops is to take equal parts by weight of sucrose and corn syrup and boil the same with sufficient water to bring about complete solution. During the boiling, starch (which may be a thick boiling starch but is preferably a thin boiling starch), is added in the form of a water starch suspension, the amount of starch varying between 10 and 15 per cent by weight on the corn syrup and cane sugar. The total amount of water used usually is in proportion of one gallon to each pound of starch. An inverting agent, such as cream of tartar, is added during the boil which produces some inversion of the cane sugar to levulose and dextrose. The starch is slightly converted by the boiling operation into hydrolysis products, mostly into soluble starch and dextrines, the increase in dextrose content through conversion of the starch to dextrose and by inversion of sucrose being insignificant, certainly not in excess of 5% of the product on dry substance basis. Analysis of such product may show approximately: sucrose 36.0% by weight; dextrines 40.1%; dextrose 19.3%; levulose 4.6%. This analysis is on a dry substance basis.

In accordance with the present invention a crystalline, high purity dextrose is substituted for the cane sugar in part or wholly. The cane sugar ingredient may vary from nothing to 40% by weight of the batch (cane sugar, corn syrup, dextrose); the corn syrup may vary from 35% to 65%; and the dextrose may be in any substantial quantity not in excess of 35%. These ranges are preferential. It is entirely possible to make confectionery of this type with wider variations in the proportions of the ingredients than indicated, but such products are likely to have characteristics not regarded as desirable. The corn syrup contains some dextrose and it is our experience that if the total dextrose is much above 60% on dry basis there will be an undesirable tendency to crystallize. By corn syrup is intended, preferably, confectioner's glucose having a purity (reducing sugar calculated as dextrose on dry substance basis) of 38–45 per cent and a gravity of 40–44 degrees Baumé and the remaining solids mostly dextrines. The dextrose substituted for sucrose may be in the form of the crystalline hydrated product of 99.5 purity (Cerelose) which centains 8% to 9% water of crystallization. If the anhydrous dextrose is used, the formulas should be varied appropriately to take account of the lack of water content in the sugar. The dextrose shortens the piece and makes it more "tender". The greater the quantity of dextrose, the shorter will be the piece. This is true if the dextrine content is not proportionately increased as will be the case if the corn syrup ingredient is increased in quantity. On the other hand as cane sugar is replaced with dextrose there must be an increase of corn syrup to prevent crystallization. A larger quantity of corn syrup can be used when dextrose is the solid sugar instead of cane sugar. This is because dextrose lowers the viscosity of the total mix. This tends to economy and makes the gum more "chewy", counterbalancing the shortening effect of the dextrose.

The following may be taken as examples of methods in accordance with the present invention:

*Example 1.*—55 pounds of cane sugar (approximately 40% of the sugar and syrup batch), 50 pounds of corn syrup and 35 pounds of crystalline dextrose (Cerelose) are dissolved in five gallons of water and boiled vigorously. 12 pounds of thin boiling starch, of preferably 40° fluidity, is suspended in seven gallons of water and added gradually with stirring to the boiling sugar and syrup mixture. 4–5 ounces of cream of tartar may be used. This mixture is cooked rapidly until a good string is obtained which will ordinarily be in about twenty minutes, depending on the steam pressure used. The starch gives the product body, that is its gum or jelly-like consistency and if hydrolyzed at all by the cooking is affected only slightly. The material when cooked is poured into starch molds and allowed to remain there for approximately 36 hours at 100–130° F. Preferably after removal from the molds, the pieces are allowed to stand for a day, before being covered with sugar, such as granular or powdered sugar, or given such other treatment as may be necessary for the finished product. Analysis of the product shows sucrose 31.7%; dextrose 35.6%; dextrine 28.9% and levulose 3.8%, all on dry basis.

*Example 2.*—35 pounds of cane sugar (35% of the sugar and syrup batch), 40 pounds of corn syrup and 25 pounds of Cerelose are dissolved in seven gallons of water and boiled vigorously. 12 pounds of starch, preferably a thin boiling starch of 40° fluidity, is suspended in 5 gallons of water and added gradually, with stirring to the boiling sugar and syrup mixture. After all the starch has been added, the batch is cooked for about 20 minutes until a good string is obtained. This time depends on the steam pressure used. Toward the end of the cooking, two ounces of cream of tartar suspended in a small amount of water is added to the batch.

The material is poured into starch molds and allowed to stay in the molds for approximately 20 hours at a temperature of approximately 90° Fahrenheit. The product will contain less sucrose and more dextrose than the product of Example 1.

*Example 3.*—25 pounds of cane sugar (25% of the sugar and syrup batch), 50 pounds of corn syrup and 25 pounds of Cerelose are dissolved in seven gallons of water and boiled vigorously. 12 pounds of 40° fluidity starch is suspended in 12 gallons of water and added, gradually and with stirring, to the boiling sugar and syrup mixture. After all of the starch has been added, the batch is cooked rapidly for about 20–25 minutes until a good string is obtained. Toward the end of the cooking operation two ounces of tartaric acid suspended in a little water is added. The cooked material is poured into starch molds and allowed to stay there for 36 hours at a temperature of 110° Fahrenheit. Analysis shows: sucrose 17.9%; dextrose 40.2%; dextrines 39.4% and levulose 2.5%, all on dry basis.

In the above examples the proportion of dextrose introduced as such to sucrose varies from 35 parts dextrose and 55 parts sucrose to equal parts of both. The sucrose ingredient may be further reduced down to zero if the corn syrup content is properly increased, or may be increased to 60 parts sucrose in which event the dextrose content (exclusive of the dextrose entering the batch as part of the corn syrup) is reduced to the lowest substantial amount.

*Example 4.*—In this case no sucrose is used. 65 pounds of corn syrup and 35 pounds of Cerelose are dissolved in 5 gallons of water and boiled vigorously. 12 to 14 pounds of 40° fluidity starch is suspended in 13 gallons of water and added gradually with stirring to the boiling sugar and syrup mixture. The batch is then cooked preferably with the addition of 4 to 5 ounces of tartaric or citric acid to give better color, until a good string is obtained, which will be in about 20–25 minutes, depending on the steam pressure. The cooked material is poured into starch molds and allowed to stay there for from 18 to 24 hours at a temperature of 110° F. Analysis shows: dextrose 55.4%; dextrines 44.6% on dry basis. By increasing the amount of Cerelose used the percentage of dextrose may be increased to some extent. The percentage of Cerelose in the dextrose—corn syrup batch—may vary from zero to 35%.

In all of the above examples thick boiling starch may be used in place of thin boiling starch if it is desired to reach the jellying point or "string" more rapidly. Thin boiling starches may be used having fluidities from 30° to 65°. The consistency of the product will be varied by varying the fluidity of the starch used. The inversion step is optional. Flavoring material will, of course, be used as heretofore.

The above examples in fact are to be taken merely as typical and illustrative. Modifications in order to obtain particular qualities desired or particular process advantages will be obvious to those skilled in the art in the light of the present disclosures; and in this connection the following observations are made:

A dextrose solution is less viscous than a sucrose solution having the same water content. As a result a batch containing dextrose can be boiled more quickly than one containing sucrose only and the same amount of corn syrup and starch. Apparently the steam bubbles will make their way out more rapidly from the less viscous solution. Shortening the boiling time tends to reduce coloration. If a dextrose containing batch is boiled to the same string as a sucrose batch ("string" being a function or evidence of viscosity) the finished batch will contain less water than the sucrose batch. Hence the completion of dehydration in the starch molds will take place more rapidly. These time elements are of economic importance in large scale operations. The reduction of dehydration in the molds effects a saving in molding starch. The lower viscosity of the finished batch makes it easier to handle in the distributing machine. Furthermore, as the most viscous element of the solution is the corn syrup, on account of the dextrine content of the latter, it is possible, when dextrose is used in part or wholly for sucrose, to increase the amount of corn syrup, which is the cheapest of the ingredients, without obtaining too stringy or "chewy" a gum.

A dextrose solution contains dextrose in several isomeric forms and therefore it crystallizes less readily than sucrose. As a result when dextrose is substituted for sucrose, the danger of granulation in the gum is diminished. Goods of this class are intended to be colloidal in character and crystallization is regarded as a defect. When dextrose is used for sucrose the corn syrup ingredient may be decreased in amount (which may be desirable in the case of certain delicate products) without running the risk of the formation of crystals in the jelly or gum. If desired, it is possible by the use of dextrose, to obtain a product from a batch in which the solid sugars may constitute as much as 75% and the syrup ingredient only 25%.

Where no sucrose is used the batch may be boiled on the acid side from start to finish which tends to reduce coloration and increase transparency. If sucrose be used, acid boiling will bring about too much inversion and at too early a stage resulting in stickiness in the product.

It will be understood that these possible advantages are not wholly consistent, one with the other. To obtain one advantage one may have to sacrifice, to some extent at least, other possible advantages. One of the important features of the invention, in fact, is that the use of dextrose makes possible a wide range of control so that it is possible to obtain by manipulations and modifications, within the skill of a competent confectionery maker, a wider range of products having more widely different characteristics than when sucrose is the only solid sugar component; and also to obtain either with or in place of such novel and improved characteristics in the product, economies in manufacture, as stated above, so far as such economies are consistent with the particular characteristics desired in the particular product being manufactured.

From the point of view of quality of the product, the greatest advantage is, perhaps, that since dextrose is less sweet than sucrose, a confection is made possible which will be less sweet and hence more agreeable to the taste than confections of this class which have heretofore been maunfactured. Moreover, this lack of sweetness given an accentuation of the flavor used, noticeable and desirable particularly in the case of the more delicate flavors. Dextrose is more readily digestible than sucrose and this is of particular advantage in gum drops which are consumed largely by children. Dextrose-containing gum drops have a softer, shorter, and less sticky or stringy consistency than gum drops made of sucrose and corn syrup. To some extent the dextrose serves the function of agar-agar, tending to counteract the contrary effect of the dextrines in the corn syrup.

The confection of this invention may be said to consist essentially of dextrose, dextrine and modified or soluble starch which has not been hydrolyzed to the dextrine stage—that is, not to the extent of the dextrine in the corn syrup, but which in the above analyses is included with the dextrine; or of dextrose, dextrine, modified starch, sucrose and in most instances levulose, together with flavoring materials or such other substances as may be added to the gum itself. The term "modified starch" is to be understood as involving hydrolysis or other change less than takes place when starch is converted by acid hydrolysis to what is commonly known as dextrine. The product differs from the usual sucrose gum product in that the dextrose content is in excess of that attributable to the corn syrup which of course consists in part of dextrose and in part of sucrose. The increase of dextrose could not be brought about by increasing the corn syrup without undue increase of dextrine. The dextrose must be added as such, and, unless taste and color are to be affected undesirably, as high purity dextrose, without the so-called impurities of certain grades of corn sugars. By "high purity dextrose" is meant a dextrose containing more than 99% dextrose on dry basis.

We claim:

1. A confection of the gum drop type containing dextrine and dextrose, the latter in excess of the amount obtainable by using corn syrup in the batch.

2. A confection of the gum drop type containing dextrine and dextrose, the latter substantially in excess of 20% of the product on dry substance basis.

3. A confection of the gum drop type containing dextrine and dextrose, the latter in amount from 35% to 55% on dry substance basis.

4. A confection of the gum drop type containing sucrose, dextrine and dextrose, the latter in excess of the amount obtainable by using corn syrup in the batch.

5. A confection of the gum drop type containing sucrose, dextrine and dextrose, the latter substantially in excess of 20% of the product on dry substance basis.

6. A confection of the gum drop type containing sucrose, dextrine and dextrose, the latter in an amount substantially more than 20%, by weight, of the product, on dry substance basis and not substantially more than 40%.

7. A confection of the gum drop type containing sucrose, levulose, dextrine and dextrose, the latter in excess of the amount obtainable by using corn syrup in the batch.

8. A confection of the gum drop type containing sucrose, levulose, dextrine and dextrose, the latter substantially in excess of 20% of the product on dry substance basis.

9. A confection of the gum drop type containing sucrose, levulose, dextrine and dextrose, the latter in an amount substantially more than 20%, by weight, of the product, on dry substance basis and not substantially more than 40%.

10. Improvement in the manufacture of confections of the gum drop type which consists in substituting a high purity dextrose for part or all of the sucrose heretofore used for making products of this type.

11. Method of manufacturing confections of the gum drop type which comprises cooking dextrose and corn syrup with the addition of starch to give the product the desired consistency.

12. Method of manufacturing confections of the gum drop type which comprises cooking sucrose, dextrose and corn syrup with the addition of starch to give the product the desired consistency.

13. Method of manufacturing confections of the gum drop type which comprises cooking high purity dextrose and corn syrup with the addition of starch to give the product the desired consistency.

14. Method of manufacturing confections of the gum drop type which comprises cooking sucrose, an inverting agent, dextrose and corn syrup with the addition of starch to give the product the desired consistency.

15. Method of manufacturing confections of the gum drop type which comprises cooking a batch of high purity dextrose and corn syrup in which the amount of added dextrose is in any substantial amount up to 35%, by weight, with the addition of starch to give the product the desired consistency.

16. Method of manufacturing confections of the gum drop type which comprises cooking a batch of high purity dextrose, corn syrup and sucrose, in which the proportions of sucrose to dextrose vary from 30 parts sucrose and 30 parts dextrose to 60 parts sucrose and a minimum amount of dextrose necessary to substantially increase the dextrose content over that attributable to the corn syrup.

17. Method of manufacturing confections of the gum drop type which comprises cooking a batch of high purity dextrose, corn syrup, sucrose, and an inverting agent, in which the proportions of sucrose to added dextrose varies from 30 parts sucrose and 30 parts dextrose to 60 parts sucrose and a minimum amount of dextrose necessary to substantially increase the dextrose content over that attributable to the corn syrup.

18. Method of manufacturing confections of the gum drop type which comprises cooking a batch of high purity dextrose, corn syrup and sucrose, in which the proportions of dextrose to sucrose vary from 35 parts dextrose and 55 parts sucrose to equal parts of each.

19. Method of manufacturing confections of the gum drop type which comprises cooking a batch of high purity dextrose in substantial amounts not exceeding 35 percent by weight of the batch, sucrose in substantial amounts not exceeding 40 percent by weight of the batch and corn syrup in varied amounts of from 35 percent to 65 percent of the batch.

20. Method of manufacturing confections of the gum drop type which comprises cooking a batch of high purity dextrose in substantial amounts not exceeding 35 percent by weight of the batch, sucrose in substantial amounts not exceeding 40 percent by weight of the batch and corn syrup in varied amounts of from 35 percent to 65 percent of the batch, in which batch the proportions of sucrose to dextrose vary from 55 parts sucrose and 35 parts dextrose to equal parts of each.

JOHN M. KRNO.
ADOLF SCHILDBERGER.